(12) United States Patent
Kwon et al.

(10) Patent No.: US 8,837,340 B2
(45) Date of Patent: Sep. 16, 2014

(54) METHOD AND SYSTEM FOR TRANSMITTING/RECEIVING DATA IN A WIRELESS COMMUNICATION SYSTEM

(75) Inventors: Kibum Kwon, Ansan-si (KR); Sung-jin Suh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 223 days.

(21) Appl. No.: 13/391,253

(22) PCT Filed: Aug. 16, 2010

(86) PCT No.: PCT/KR2010/005374
§ 371 (c)(1),
(2), (4) Date: Feb. 17, 2012

(87) PCT Pub. No.: WO2011/021814
PCT Pub. Date: Feb. 24, 2011

(65) Prior Publication Data
US 2012/0155355 A1 Jun. 21, 2012

(30) Foreign Application Priority Data

Aug. 21, 2009 (KR) .................. 10-2009-0077662

(51) Int. Cl.
*G08C 17/00* (2006.01)
*H04W 76/04* (2009.01)
(52) U.S. Cl.
CPC .................. *H04W 76/048* (2013.01)
USPC ............ 370/311; 370/310; 370/312; 370/315
(58) Field of Classification Search
None
See application file for complete search history.

(56) References Cited

U.S. PATENT DOCUMENTS

| | | | |
|---|---|---|---|
| 2007/0155315 A1* | 7/2007 | Lee et al. | 455/11.1 |
| 2007/0291673 A1* | 12/2007 | Demirhan et al. | 370/311 |
| 2008/0225772 A1 | 9/2008 | Xu | |
| 2008/0285478 A1 | 11/2008 | Schladetzky et al. | |
| 2009/0034485 A1* | 2/2009 | Tseng | 370/335 |
| 2009/0147723 A1* | 6/2009 | Fang et al. | 370/315 |
| 2009/0180414 A1* | 7/2009 | Maeda et al. | 370/311 |

FOREIGN PATENT DOCUMENTS

| | | |
|---|---|---|
| CN | 101483925 | 7/2009 |
| CN | 101485118 | 7/2009 |
| WO | 2009048276 | 4/2009 |

OTHER PUBLICATIONS

International Search Report issued for related International Application PCT/KR2010/005374 dated Apr. 26, 2011.

* cited by examiner

*Primary Examiner* — Anez Ebrahim
(74) *Attorney, Agent, or Firm* — H.C. Park & Associates, PLC

(57) ABSTRACT

The present specification relates to a wireless communication system, and more particularly, discloses a method and system for discontinuous reception for data transmission/reception in a wireless communication system. The present specification discloses a scheme in which a terminal checks a parameter for controlling the discontinuous reception (DRX) of a second component carrier, said parameter being different from the parameter for controlling the discontinuous reception (DRX) of a first component carrier used by a base station, and receives data through the discontinuous reception of the first component carrier and of the second component carrier.

21 Claims, 14 Drawing Sheets

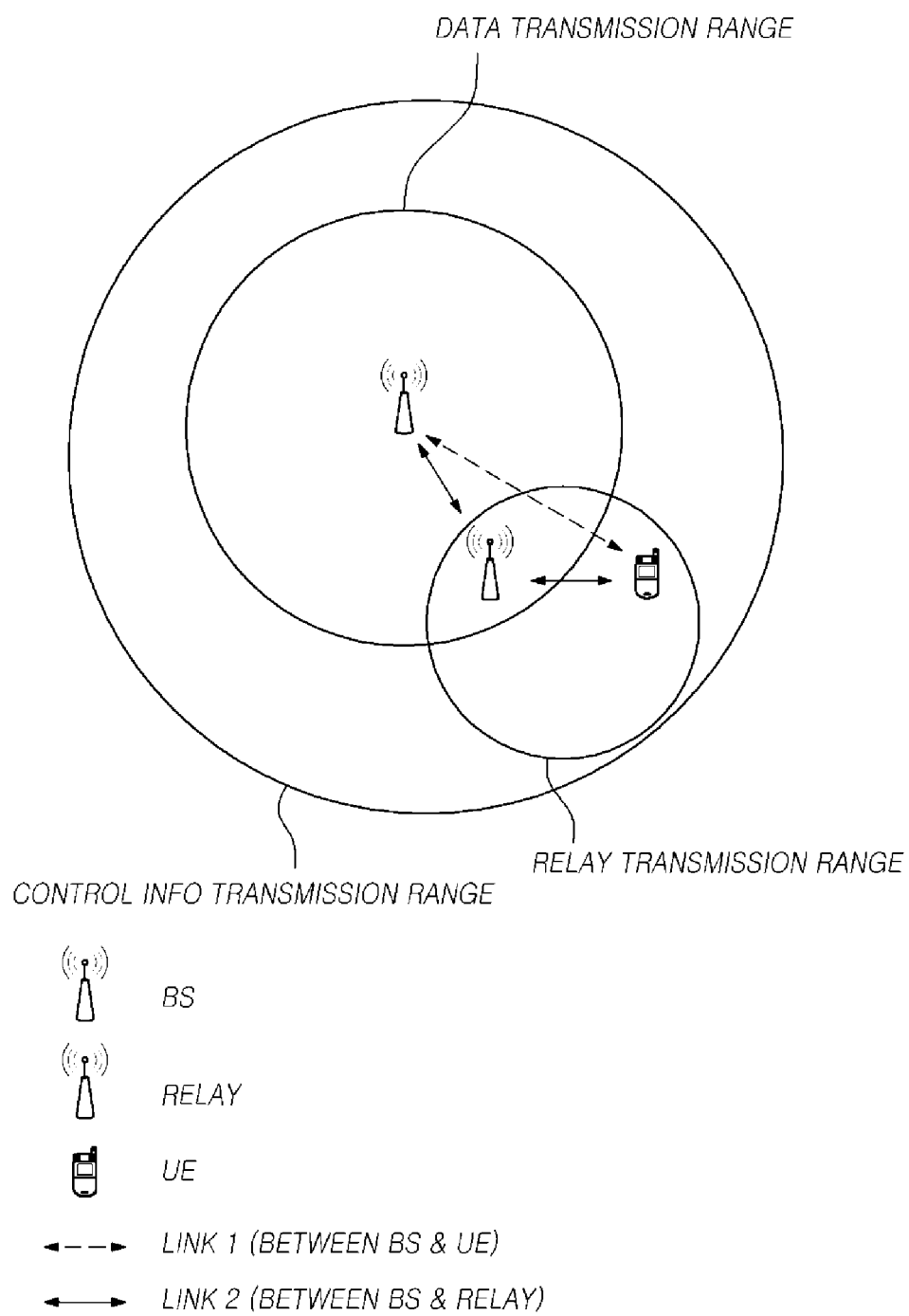

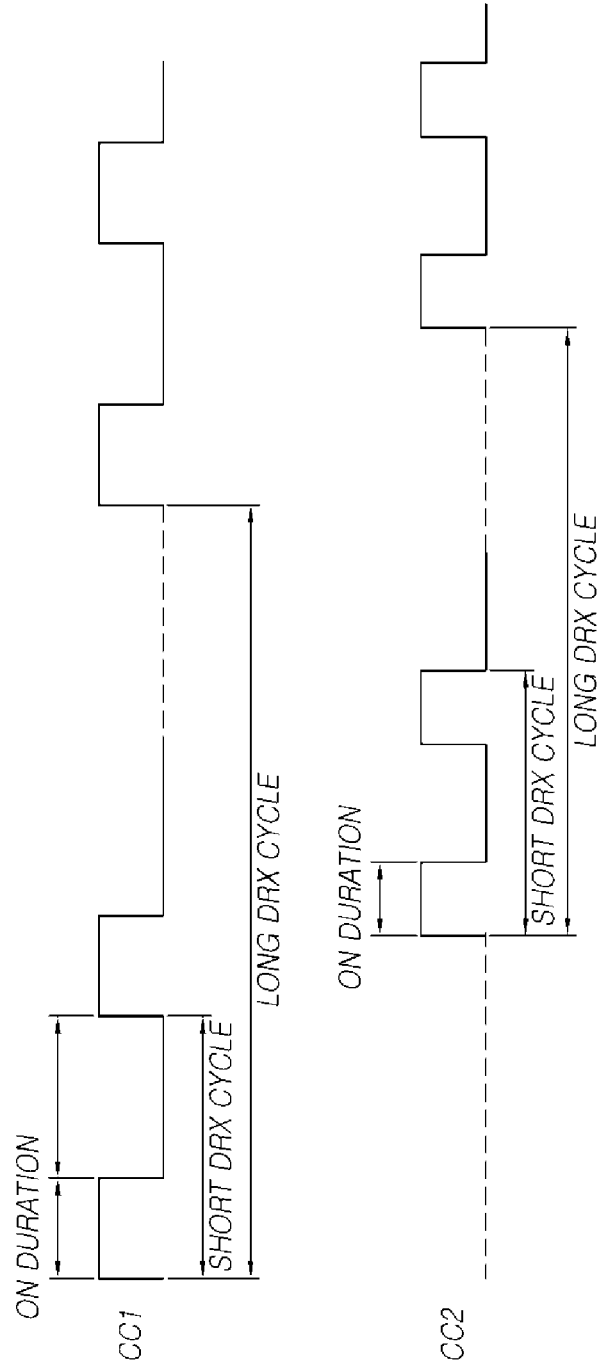

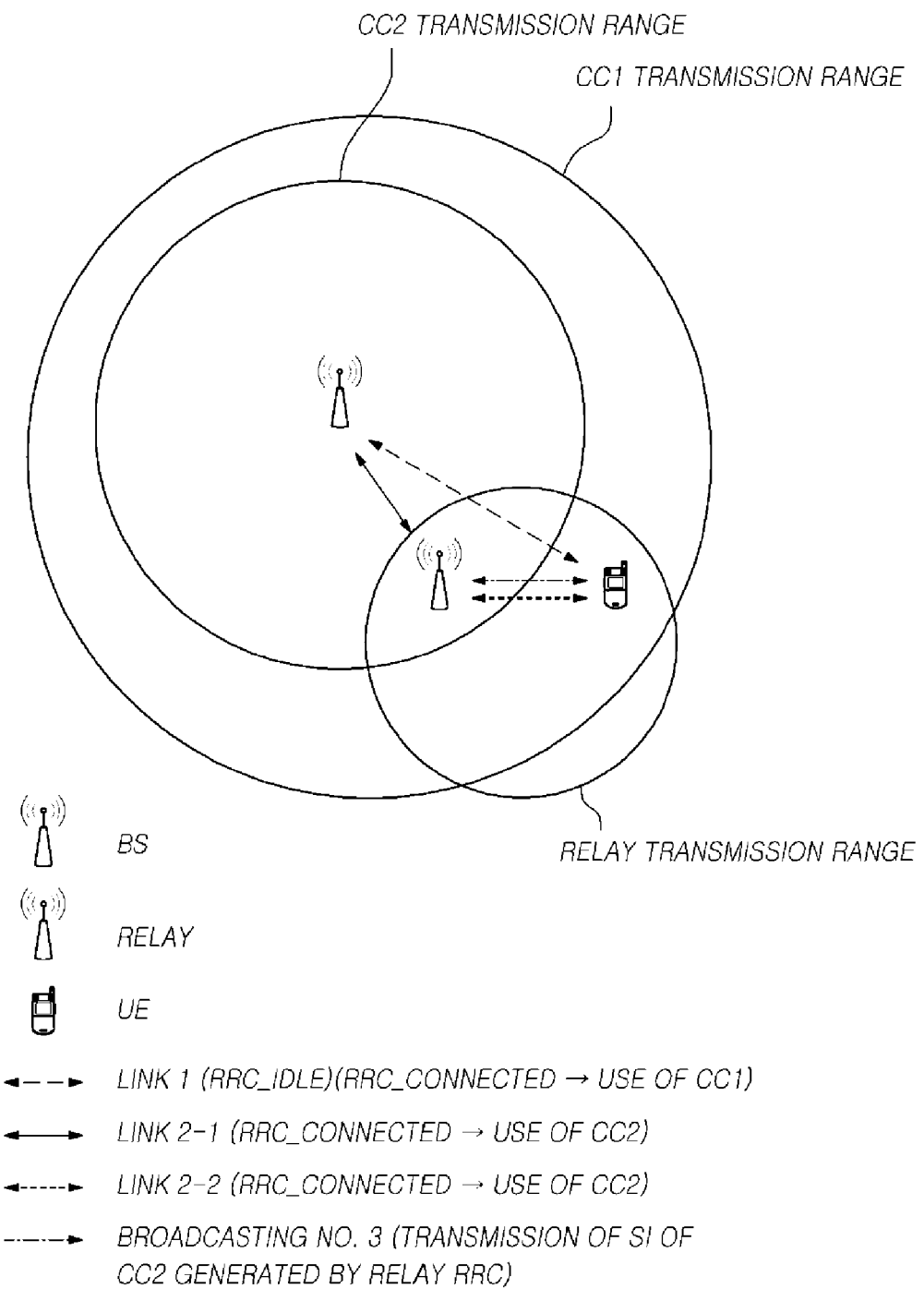

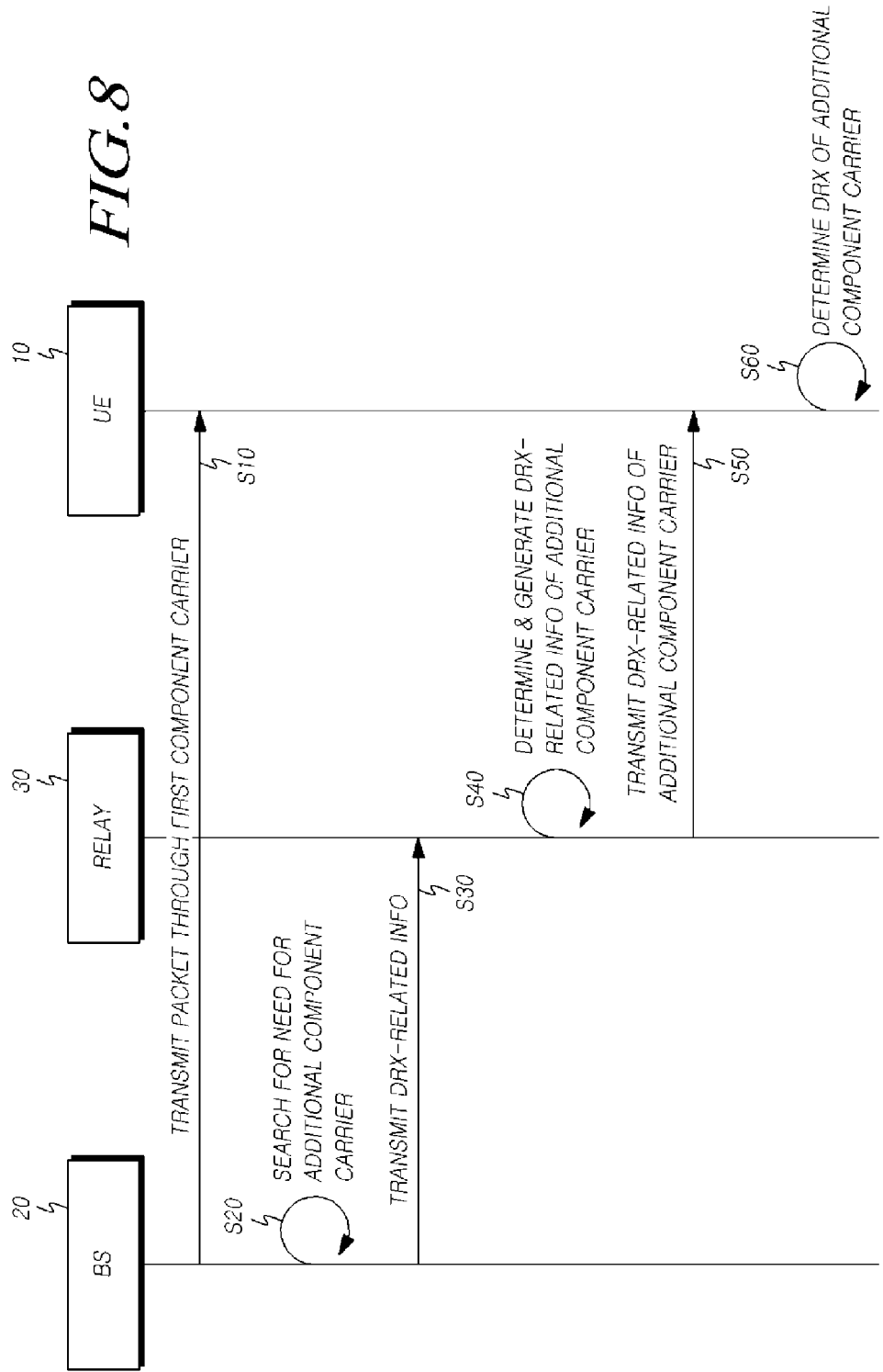

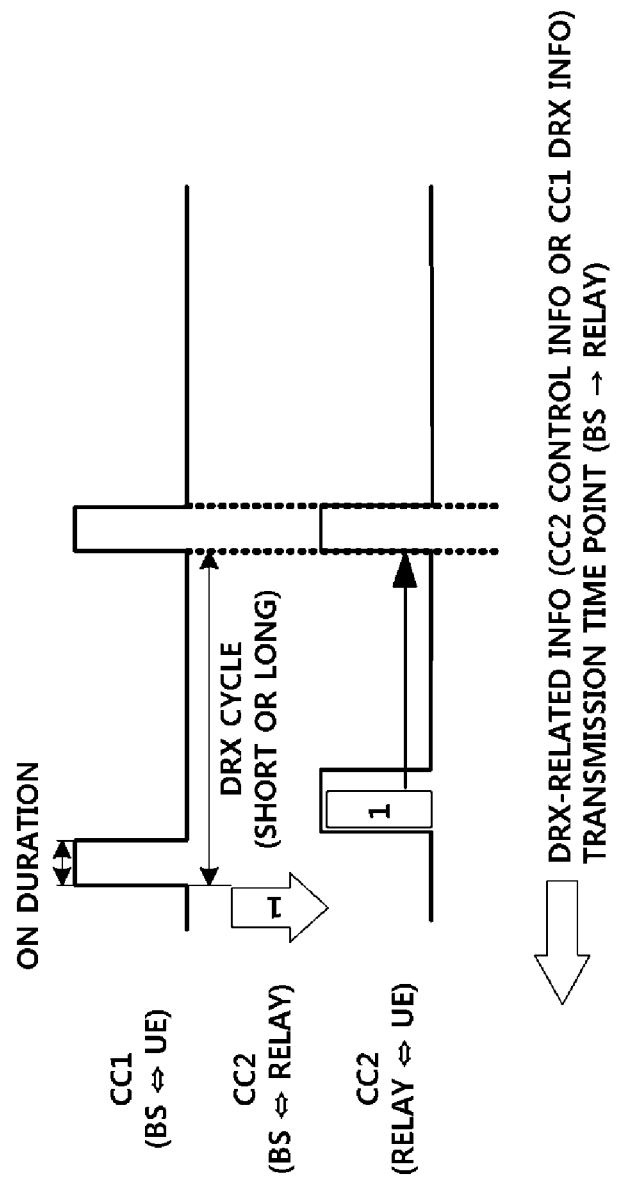

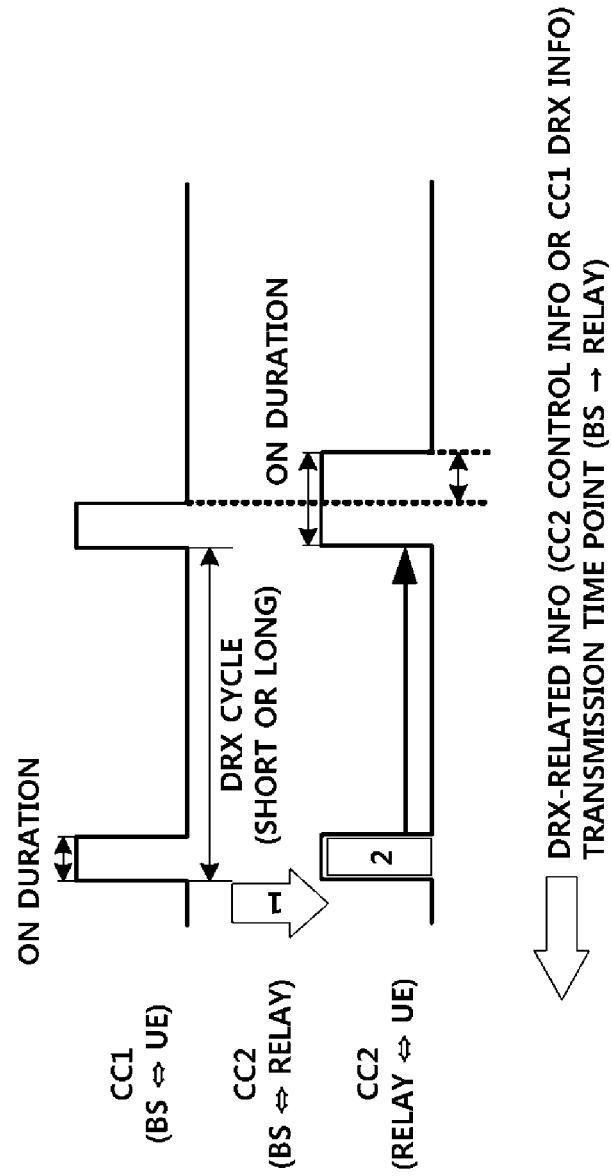

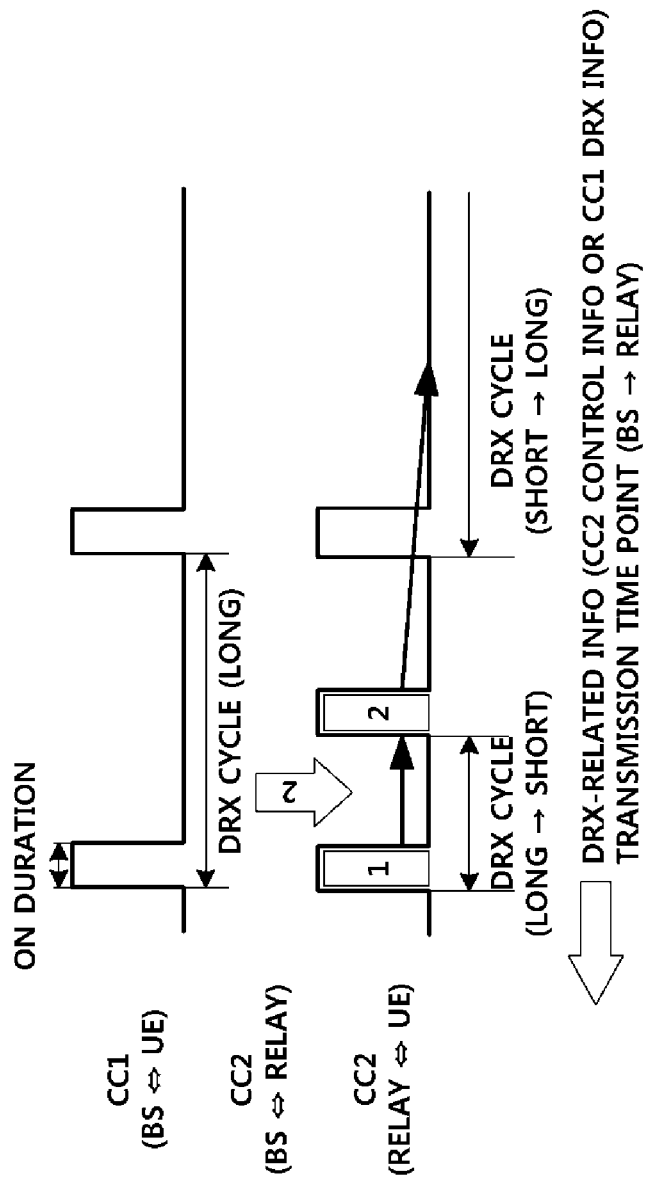

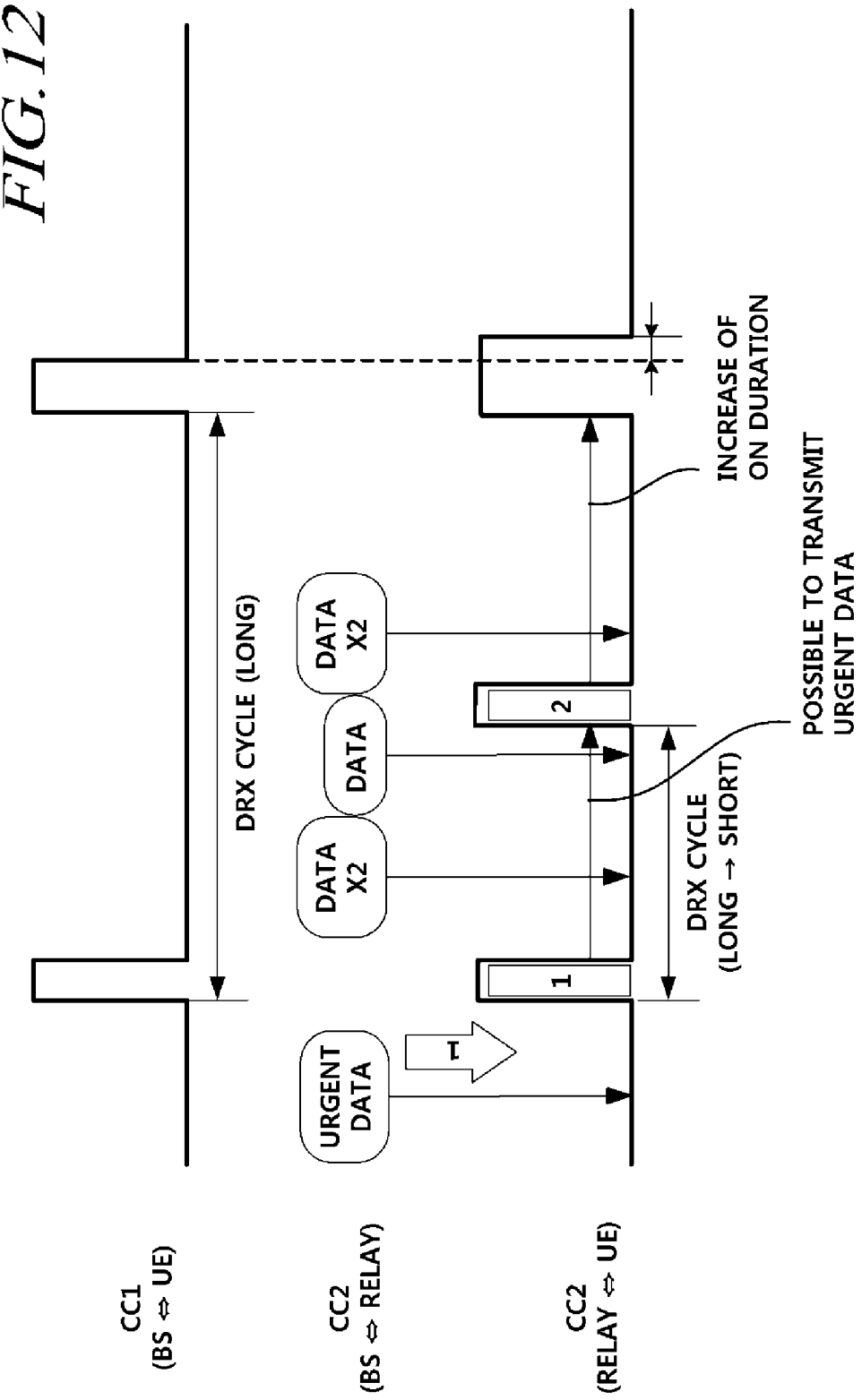

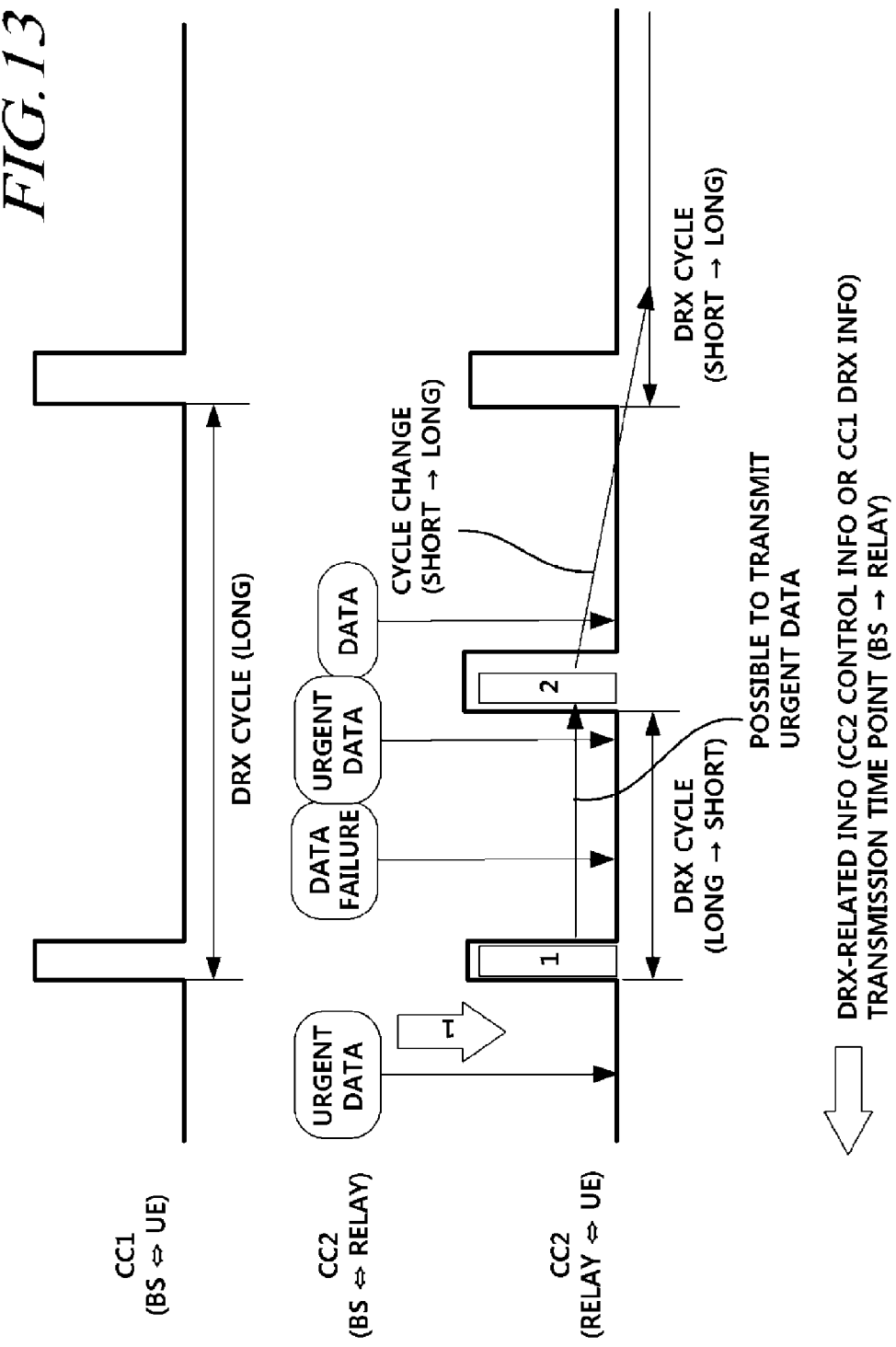

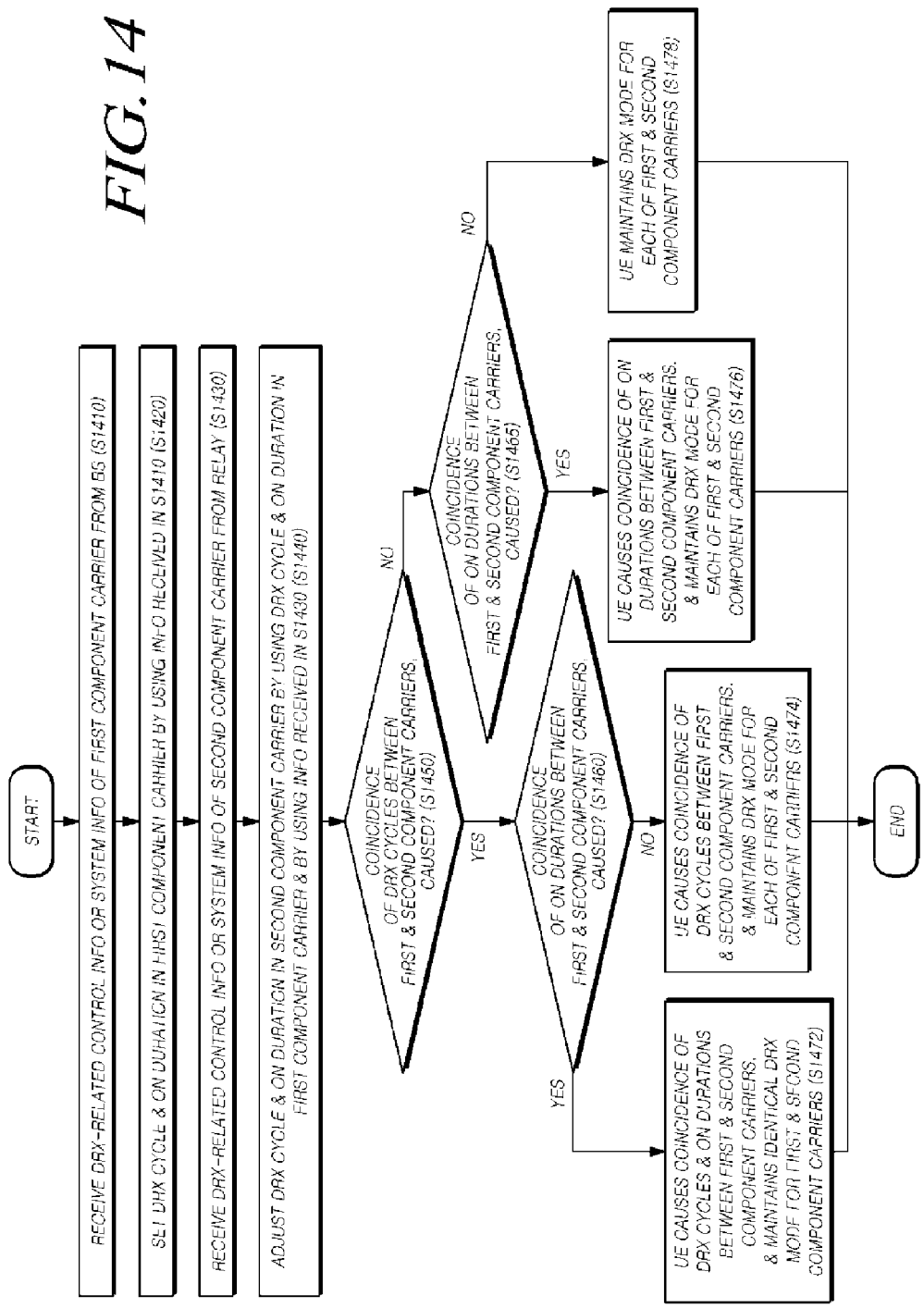

METHOD AND SYSTEM FOR TRANSMITTING/RECEIVING DATA IN A WIRELESS COMMUNICATION SYSTEM

CROSS-REFERENCE TO RELATED APPLICATION

This application is the National Stage Entry of International Application PCT/KR2010/005374, filed on Aug. 16, 2010, and claims priority from and the benefit of Korean Patent Application No. 10-2009-0077662, filed on Aug. 21, 2009, both of which are incorporated herein by reference for all purposes as if fully set forth herein.

BACKGROUND

1. Field

The present invention relates to a wireless communication system, and more particularly to a method and a system for discontinuous reception for data transmission/reception in a wireless communication system.

2. Discussion of the Background

With the development of a communication system, consumers such as companies and individuals have used a wide variety of wireless terminals.

Accordingly, communication service providers have continued to attempt to create a new communication service market for wireless terminals, and expand the existing communication service market by providing reliable and low-cost services.

SUMMARY

Therefore, the present invention has been made in view of the above-mentioned problems, and the present invention provides a method and a system for discontinuous reception for data transmission/reception in a wireless communication system.

The present invention also provides a method and a system for performing DRX of at least one component carrier in a wireless communication system.

The present invention also provides a method and a system, in which a base station and a relay transmit DRX parameters of two or more component carriers to a user equipment in a wireless communication system.

The present invention also provides a method and a system for transmitting/receiving data through discontinuous reception by using a parameter for controlling discontinuous reception (DRX) of a second component carrier, which is discriminated from a parameter for controlling discontinuous reception of a particular first component carrier used by a base station in a wireless communication system.

The present invention also provides a method and a system for adaptively controlling a cycle and a DRX on-duration for performing DRX of at least one component carrier in a wireless communication system.

The present invention also provides a method and a system for setting an identical DRX cycle and an identical on-duration for one or more component carriers in a wireless communication system.

The present invention also provides a method and a system for independently setting a DRX cycle and a DRX on-duration for each of one or more component carriers in a wireless communication system.

The present invention also provides a method and a system for setting at least one of a DRX cycle and an active time or a DRX on-duration of a component carrier so as to become a multiple of a DRX cycle and a multiple of an active time or a DRX on-duration in another component carrier, in a wireless communication system.

In order to accomplish the above-mentioned objects, in accordance with an aspect of the present invention, there is provided a method for transmitting data by a relay in a wireless communication system, the method including: generating at least one of control information and system information of a second component carrier discriminated from a particular first component carrier used by a base station for transmission, in consideration of a channel state or a link performance of a user equipment; and transmitting at least one of the generated control information and system information of the second component carrier to the user equipment.

In accordance with another aspect of the present invention, there is provided a method for transmitting data in a wireless communication system, the method including: generating at least one of control information and system information of a particular first component carrier by a base station; transmitting the generated at least one of the control information and the system information of the first component carrier from the base station to a user equipment; generating at least one of control information and system information of a second component carrier discriminated from the first component carrier in consideration of a channel state and a link performance of the user equipment by a relay; and transmitting the generated at least one of the control information and the system information of the second component carrier from the relay to the user equipment.

In accordance with another aspect of the present invention, there is provided a method for receiving data by a user equipment in a wireless communication system, the method including: receiving at least one information of DRX-related control information and system information of a first component carrier from a base station; performing a discontinuous reception (DRX) operation for the first component carrier according to the at least one received information; receiving, from a relay, at least one of DRX-related control information and system information of a second component carrier discriminated from the first component carrier; and performing a discontinuous reception operation for the second component carrier so as to be discriminated from the discontinuous reception operation for the first component carrier according to the at least one information received from the relay.

In accordance with another aspect of the present invention, there is provided a method for receiving data by a user equipment, the method including: receiving discontinuous reception (DRX)-related control information or system information of a first component carrier from a base station; setting a DRX cycle and a DRX on-duration of the first component carrier by using the information received from the base station; receiving DRX-related control information or system information of a second component carrier from a relay; adjusting a DRX cycle and a DRX on-duration of the second component carrier by using the DRX cycle and the DRX on-duration of the first component carrier and the information received in step S1430; and determining whether the DRX cycle and the DRX on-duration of the second component carrier coincide with the DRX cycle and the DRX on-duration of the first component carrier, and controlling DRX of the first component carrier and DRX of the second component carrier.

In accordance with another aspect of the present invention, there is provided a user equipment for controlling a discontinuous reception (DRX) mode, the user equipment including: a DRX setter for receiving DRX-related control information or system information of a first component carrier from a base station, setting a DRX cycle and a DRX on-duration of a first component carrier by using the information received from the base station, receiving DRX-related control information or system information of a second component carrier from a relay, and adjusting a DRX cycle and a DRX on-duration of the second component carrier by using the DRX cycle and the DRX on-duration of the first component carrier and the information received from the relay; and a DRX controller for determining whether the DRX cycle and the DRX on-duration of the second component carrier coincide with the DRX cycle and the DRX on-duration of the first component carrier, respectively, and controlling DRX of the first component carrier and DRX of the second component carrier.

BRIEF DESCRIPTION OF THE DRAWINGS

The foregoing and other objects, features and advantages of the present invention will become more apparent from the following detailed description when taken in conjunction with the accompanying drawings in which:

FIG. 5 is a view illustrating a structure for data transmission considering a relay system;

FIG. 6 is a view illustrating a DRX structure of each component carrier;

FIG. 7 is a view illustrating a structure for data transmission considering a relay system using component carriers;

FIG. 8 is a signal flow diagram illustrating the transmission of component carrier-related information considering a relay in a wireless communication system;

FIG. 9 to FIG. 11 are views each illustrating a configuration in which a user equipment receives DRX-related information of a second component carrier from a relay and adjusts a DRX cycle and a DRX on-duration in an idle mode;

FIG. 12 and FIG. 13 are views each illustrating a configuration in which a user equipment receives DRX-related information of a second component carrier from a relay and adjusts a DRX cycle and a DRX on-duration in a connected mode; and FIG. 14 is a flowchart illustrating a process for controlling DRX by a user equipment according to an embodiment of the present invention.

DETAILED DESCRIPTION OF THE ILLUSTRATED EMBODIMENTS

Figure 1:
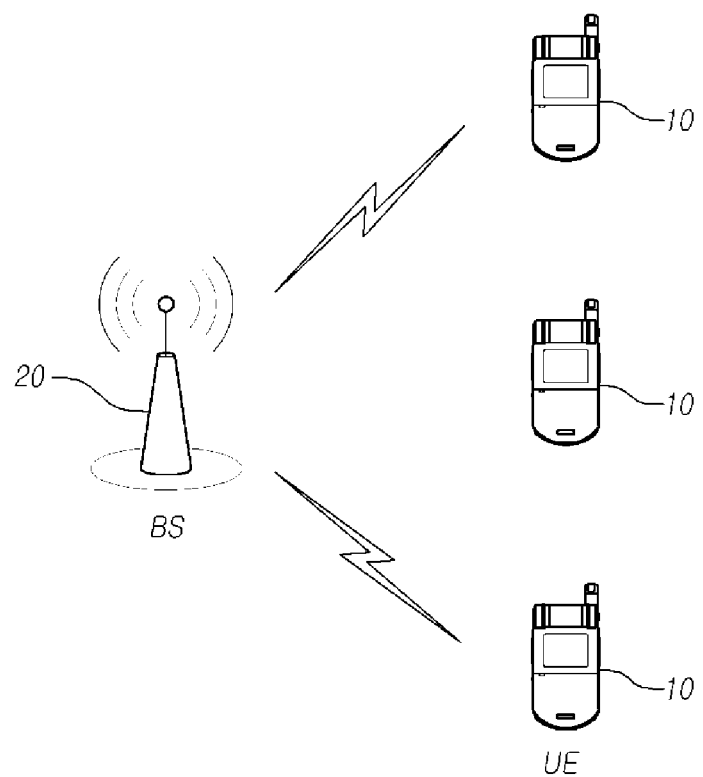
FIG. 1 is a view schematically illustrating the configuration of a wireless communication system to which embodiments of the present invention are applied.

Hereinafter, exemplary embodiments of the present invention will be described in detail with reference to the accompanying drawings. It should be noted that in assigning reference numerals to elements in the drawings, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be understood that if it is described in the specification that one component is "connected," "coupled" or "joined" to another component, a third component may be "connected," "coupled," and "joined" between the first and second components, although the first component may be directly connected, coupled or joined to the second component.

FIG. 1 is a view schematically illustrating the configuration of a wireless communication system to which embodiments of the present invention are applied.

The wireless communication system is widely arranged in order to provide various communication services, such as voice, packet data, etc.

Referring to FIG. 1, the wireless communication system includes a User Equipment (UE) 10 and a Base Station (BS) (20). The user equipment 10 and the base station 20 use various methods for transmitting information and various methods for controlling electric power, which will be described below.

In this specification, the User Equipment (UE) 10 has a comprehensive concept implying a user terminal in wireless communication. Accordingly, the UEs should be interpreted as having the concept of including a MS (Mobile Station), a UT (User Terminal), an SS (Subscriber Station), a wireless device, and the like in GSM (Global System for Mobile Communications) as well as UEs (User Equipments) in WCDMA (Wideband Code Division Multiple Access), LTE (Long Term Evolution), HSPA (High Speed Packet Access), etc.

The base station 20 or a cell usually refers to a fixed station communicating with the user equipment 10, and may be called different terms, such as a Node-B, an eNB (evolved Node-B), a BTS (Base Transceiver System), and an AP (Access Point).

Namely, in this specification, the base station 20 or the cell should be interpreted as having a comprehensive meaning indicating a partial area covered by a BSC (Base Station Controller) in CDMA (Code Division Multiple Access) or a Node-B in WCDMA (Wideband Code Division Multiple Access). Accordingly, the base station 20 or the cell has a meaning including various coverage areas such as a mega cell, a macro cell, a micro cell, a pico cell, and a femto cell.

In this specification, the user equipment 10 and the base station 20, which are two transmission and reception subjects used to implement the art or the technical idea described in this specification, are used as a comprehensive meaning, and are not limited by a particularly designated term or word.

There is no limit to multiple access schemes applied to the wireless communication system. For example, use may be made of various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA.

In this respect, use may be made of a TDD (Time Division Duplex) scheme in which uplink transmission and downlink transmission are performed at different times. Otherwise, use may be made of an FDD (Frequency Division Duplex) scheme in which uplink transmission and downlink transmission are performed by using different frequencies.

An embodiment of the present invention may be applied to the allocation of resources in the field of asynchronous wireless communications which have gone through GSM, WCDMA and HSPA, and evolve into LTE (Long Term Evolution) and LTE-advanced, and in the field of synchronous wireless communications which evolve into CDMA, CDMA-2000 and UMB. The present invention should not be interpreted as being limited to or restricted by a particular wireless communication field, and should be interpreted as including all technical fields to which the spirit of the present invention can be applied.

Figure 2:
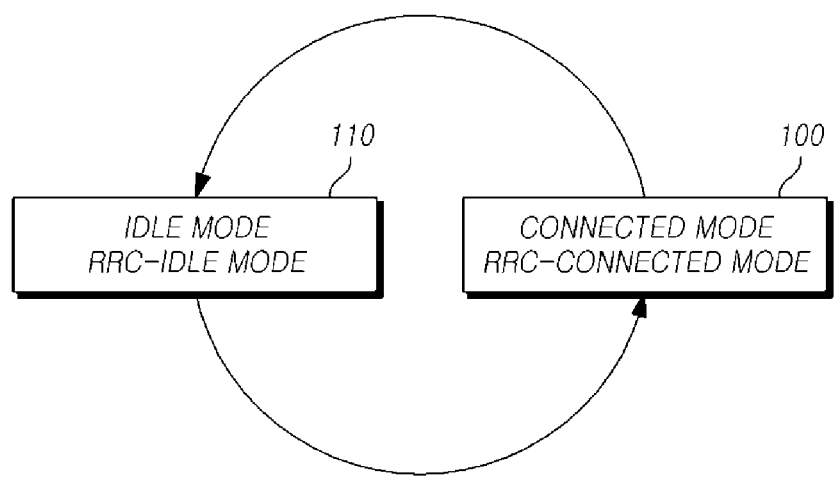
FIG. 2 illustrates states of a user equipment shown in FIG. 1.

FIG. 2 illustrates states of a user equipment to which embodiments of the present invention are applied.

Referring to FIG. 2, the user equipment 10 may operate in two modes, such as a connected mode 100 and an idle mode 110.

The term "connected mode 100" refers to an active state of the user equipment 10. In the connected mode 100, the user equipment 10 is connected to the particular base station 20 in a network. Not only IDentity (ID) of the user equipment 10 but also one or more Internet Protocol (IP) addresses, which are to be used for signaling between the user equipment 10 and the network, are allocated to the user equipment 10. In the connected mode 100, uplink may be synchronized or not synchronized with the network.

In order to acquire and maintain uplink synchronization, the base station 20 or a receiver of the base station 20 may measure a time of arrival of transmission from each activated user equipment 10, and may transmit a timing-corrected command in a downlink. While the uplink is synchronized with the network, it is possible to transmit user data and a signal for controlling a layer 1 (a physical layer)/a layer 2 (a MAC layer, an RRC layer, an RLC layer, a PDCP layer, or the like) in a downlink. Herein, RRC represents Radio Resource Control.

When uplink transmission does not occur in a given time window, it is declared that it is impossible to perform the allocation of time and uplink is not synchronized. In this case, the user equipment must perform a random access procedure in order to resume uplink synchronization.

Meanwhile, the term "idle mode 110" refers to a low activity state in which the user equipment 10 sleeps most of the time in order to reduce the consumption of a battery. In the idle mode 110, uplink synchronization is not maintained, and hence, the only uplink transmission activity that may take place is random access for moving to the connected mode 100.

Meanwhile, in the downlink, the mobile terminal 10 may periodically wake up in order to be paged for incoming calls. The mobile terminal 10 keeps its IP address or other internal information in order to rapidly move to the connected mode 100 when necessary.

Figure 3:
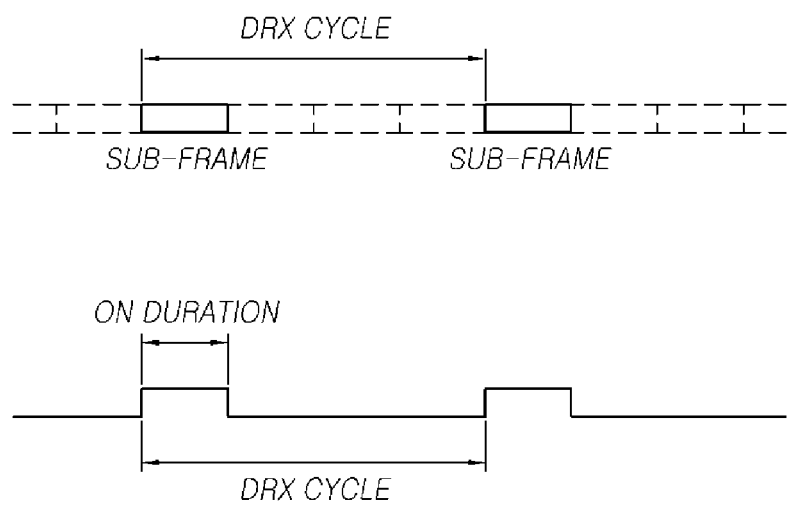
FIG. 3 is a view illustrating a basic DRX structure for paging.

FIG. 3 illustrates a structure explaining the concept of DRX, to which embodiments of the present invention are applied.

First, paging may be used for a connected setup. An effective paging procedure is that the user equipment 10 sleeps most of the time and wakes up briefly for a given time period in order to monitor paging information from the network. In order to notify the transmission of paging information to the user equipment 10, a separate channel (e.g. a paging indicator channel) may be used, or an operation identical to usual downlink data transmission may be used.

At this time, the user equipment 10 may monitor L1/L2 control signaling for downlink scheduling allocation. In the latter case, so that the user equipment 10 may sleep most of the time and wake up only for a short period of time in order to monitor L1/L2 control signaling, a DRX operation may be used.

When the user equipment 10 searches for a group identity (ID) used for paging while waking up, it may process a corresponding downlink paging message transmitted through a paging channel. The paging message includes an ID of a paged user equipment, and the user equipment 10, which has not found its ID, disregards the received information, and sleeps on a DRX cycle.

A basic operation of DRX operates on a set DRX cycle. When the DRX cycle is set, the user equipment 10 monitors downlink control signaling for a sub-frame at every DRX cycle, and turns off a receiver or a reception circuit and operates in an idle state, for remaining sub-frames. The longer the DRX cycle becomes, the lower the power consumption of the user equipment becomes.

It is impossible to include all data of a transmission buffer in a sub-frame and then transmit the sub-frame including all the data of the transmission buffer, so that additional sub-frames are required. Accordingly, the user equipment 10 maintains an active state for a time period which can be set. The user equipment 10 initiates an activation timer, and wakes up until the set time period ends. A long DRX cycle for which the user equipment wakes up for a predetermined cycle, is enough to provide most communication services.

However, some services such as Voice over Internet Protocol (VoIP) are characterized by an inactive cycle or an almost inactive cycle following a normal transmission cycle. In order to handle these services, the second shortest DRX cycle is selectively used together with a long DRX cycle. It is usual that the user equipment operates on a long DRX cycle. However, when the user equipment is recently scheduled, it operates on a short DRX cycle for a predetermined time period.

In other words, the DRX is one of several methods for saving battery power of the user equipment 10, and allocates a DRX cycle, during which each user equipment 10 wakes up periodically, to each user equipment 10. During a DRX cycle, the user equipment 10 may turn on a reception modem thereof, and may receive information transmitted from a network through the reception modem thereof. For a period other than the DRX cycle, the user equipment 10 turns off a receiver thereof, and operates in a power saving mode.

Various DRX parameters including the DRX cycle are determined by the network (e.g. the base station or a relay). When the user equipment 10 is initially registered on the network, the various DRX parameters may be allocated to the user equipment 10, and the DRX parameters allocated to the user equipment 10 may be changed while the user equipment 10 operates when necessary.

The DRX parameters may include two major parameters, such as a DRX cycle corresponding to a period, for which a DRX on-duration (i.e. a period for which the user equipment operates a modem in order to receive a signal at a predetermined time point) is periodically repeated on an inactive cycle, and an active time representing the total time period for which the user equipment 10 wakes up.

Examples of specific DRX parameters used in the wireless communication system (e.g. an LTE system) will be described below based on the DRX parameters as described above.

On-duration Timer (onDurationTimer): a timer representing the on-duration during a DRX cycle.

Inactivity Timer (drx-InactivityTimer): a timer which keeps the user equipment 10 awake for a certain period during data transmission although the on-duration is expired.

SR-pending Timer: a scheduling request of the user equipment 10 is pending until an uplink (UL) grant is received from the base station. Therefore, the user equipment 10 previously receives a period, for which a PDCCH (Physical Downlink Control CHannel) including UL grant information may be transmitted, as a parameter of the SR-pending timer, and monitors the PDCCH for the relevant period. The PDCCH is mainly used to transmit downlink control information, such as scheduling decision.

UL retransmission Timer: a timer representing the period of monitoring the PDCCH in order to receive information on a UL grant for retransmission.

DL retransmission Timer: a timer representing a retransmission period for each of all HARQ processes (8 retransmission timers) of a downlink.

Short cycle timer: a timer used when a short DRX cycle is configured. It is defined by a multiple of a minimum unit time, which is necessary to transmit control information and system information, before a new short DRX cycle begins. For example, it may be defined by the number of TTIs (Transmit Time Intervals).

Meanwhile, a carrier aggregation may be used in wireless communication in order to support a wider bandwidth. Namely, a base station or cell 20 may use multiple component carriers in order to cause a transmission/reception bandwidth to be more extended than before in an uplink and in a downlink. At this time, all component carriers may be set so as to be compatible with the use of only one bandwidth or carrier. It can be understood that a component carrier signifies a wireless communication bandwidth before the use of a carrier aggregation.

Meanwhile, a relay may be considered in order to improve high-speed data communication, a group mobility, a temporary use of a network and a cell edge processing rate, and to provide the coverage of new areas.

Figure 4:
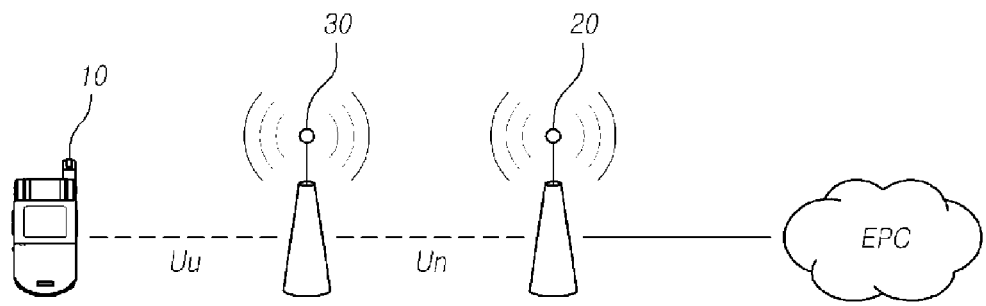
FIG. 4 is a view schematically illustrating the configuration of an example of a relay network.

FIG. 4 is a view schematically illustrating the configuration of a network including a relay in an example of the present invention.

Referring to FIG. 4, a relay network or a network architecture considering a relay includes a relay or relay node 30 between the user equipment 10 and the base station 20 connected to a core network. In FIG. 4, Un represents a wireless interface defined between the relay 30 and the base station 20, and Uu represents a wireless interface defined between the user equipment 10 and the relay 30.

As noted in FIG. 4, relays of two types may be considered.

In a type I relay, the relay 30 may have its own physical cell ID, and may transmit its own synchronization channel, and its own reference symbols or reference signals. In the type I relay, wireless self-backhauling exists between a donor cell and a relay. From the user equipment 10's perspective, the relay 30 may look like an independent cell discriminated from the donor cell. Through a single-cell operation, the user equipment 10 receives scheduling information and HARQ feedback directly from the type I relay, and transmits its control channel (SR/CQI/ACK) to the type I relay.

Meanwhile, in a type II relay, the relay 30 does not have a separate cell ID, and thus may not generate any new cells. In the type II relay, the relay 30 may relay information from the user equipment 10 or may receive the relayed information. At least, the user equipment 10 may not know the existence of the type II relay.

Meanwhile, the wireless communication system, which has been described with reference to FIG. 1 and FIG. 4, may be constructed by relatively including the user equipment 10, the base station 20 and the relay 30, instead of absolutely including them.

For example, the relay 30 may operate as the base station, and some of the user equipments 10 may operate as the relay 30. In this specification, the relay, which is a main agent used to implement the art or the technical idea described in this specification, is used in a comprehensive meaning, and is not limited by a specifically designated term or word.

Meanwhile, hereinafter, when an additional component carrier is needed according to service requirements of the user equipment 10 in the wireless communication system, this specification will disclose a scheme where the additional component carrier is allocated to the user equipment 10 and the base station 20 transmits data intended to be transmitted to the user equipment 10 through the relay 30.

Broadly, DRX-related information of the additional component carrier may be received from the base station 20, and then the relay 30 may be controlled by using the received DRX-related information. Otherwise, the relay 30 may make its own decision in consideration of both the DRX-related information received from the base station 20 and various system parameters, and then may control the relay 30. Otherwise, the relay 30 may independently control the relay 30. To this end, the present invention provides a scheme where the relay 30 generates system information or control information necessary for the user equipment 10 and transmits the generated system information or control information to the user equipment 10, a scheme for operating the relay 30 in this manner, and a wireless communication system for executing methods for the above schemes. Herein, the system information may be defined as information that the user equipment must recognize among multiple pieces of information of the wireless communication system. Also, control information may be defined as information necessary to cause an element (e.g. the user equipment or the base station) of the wireless communication system to request or support the change of an algorithm or state in the wireless communication system.

FIG. 5 is a view illustrating a structure for data transmission considering a relay system according to an embodiment of the present invention.

Referring to FIG. 5, in an idle mode, the user equipment 10 is located in an area where control information is received from the base station 20, and camps on a relevant cell through link 1 (shown in a dotted line). In FIG. 5, the term "camp on" implies that the user equipment 10 first goes through a process of establishing synchronization with the base station 20, and receiving basic control information for communicating with the base station 20 and receiving an MIB (Master Information Block) transmitted on a PBCH (Physical Broadcast channel) and SIBs (System Information Blocks) transmitted on a PDSCH (Physical Downlink Shared Channel), and then enters a state of being capable of performing communication in a particular bandwidth.

However, in a connected mode or transmission/reception mode, the user equipment 10 is not included in a data transmission range, or does not satisfy service requirements, and thus may not perform communication through link 1 (shown in a dotted line). Accordingly, the user equipment 10 may perform communication in such a manner as to transmit/receive data through link 2 (shown in a straight line). At this time, system information transmitted to the user equipment 10 is first set by the base station 20, and is then transmitted through the relay 30.

For example, DRX-related information included in system information may be managed by the base station 20, and may be operated in such a manner as to deliver it through the relay 30.

FIG. 6 is a view illustrating a DRX structure of each component carrier according to another embodiment of the present invention.

FIG. 6 illustrates an example of operating a DRX scheme when use is made of multiple component carriers considered in the next generation communication system such as LTE- Advanced. Namely, in an embodiment shown in FIG. 6, the base station 20 operates an independent DRX scheme for each component carrier.

Problems do not occur when an independent DRX scheme for each component carrier is operated in the wireless communication system which uses only one bandwidth. In contrast, the next generation communication system such as LTE-Advanced employs a scheme for combining multiple component carriers, which may have discontinuous bandwidths and different transmission ranges, and operating in a single system. Each component carrier may be operated in a form such as an independent LTE communication system, and an independent DRX may be operated for each component carrier. In the case of employing this scheme, it is hardly possible to obtain the effect of power saving corresponding to a basic objective of DRX.

Meanwhile, when there is a component carrier transmitted by using the relay 30 among multiple component carriers allocated to the single user equipment 10 (because component carriers may have different service ranges and different interference environments, respectively), it is difficult to transmit a timing of data delivered through a component carrier transmitted by the relay 30 and a timing of data delivered through a component carrier transmitted by the base station 20, according to the intention of the base station 20.

This is because communication between the base station 20 and the relay 30 is also wireless communication and various situations including an error of transmission data and the like may occur similarly to a case where the base station 20 operates wireless resources by allocating them to the user equipment 10. Therefore, in order to accomplish the basic objective (i.e. power saving) of DRX, the role of the relay 30, as well as the role of the base station, must be additionally taken into account, and then a solution must be provided to a problem of power saving.

In a typical wireless communication system, for a resource-effective communication service, the overall service area is spatially divided according to base station service coverage areas, and identical time/frequency resources are reused in the divided areas. The typical wireless communication system may use a repeater or relay 30 to extend a service area while minimizing service support and installation cost for a blanket area where a mobile communication service is poor in the service area.

Particularly, in the next generation communication system such as LTE-Advanced, in order to efficiently support a service requested by the user equipment 10 at an unspecified location, there has been an active discussion about a scheme for improving the reliability of a signal intended to be transmitted by using a scheme for first demodulating and analyzing the signal, and then again modulating and transmitting the signal by the relay 30 instead of the repeater for simply amplifying and delivering a signal, a scheme where the relay 30, which is not the base station, may control resources separately from the base station by defining a function up to layer 3 (use of a radio protocol identical to eNB within a section Uu), and the like.

Accordingly, in this specification, when an additional component carrier is needed according to service requirements of the user equipment 10 in the wireless communication system, the additional component carrier is allocated to the user equipment 10 and the base station 20 transmits data intended to be transmitted to the user equipment 10 through the relay 30. In this case, efficient power saving is intended to be implemented through a DRX scheme of the relay 30, which is based on cooperative communication corresponding to a scheme where the base station 20 and the relay 30 share control information and system information of the additional component carrier with each other, in order to transmit system information, which the user equipment 10 requires so that the relay 30 may control the DRX scheme for the additional component carrier, and data, which has been received from the base station 20, from the relay to the user equipment 10, or which is based on cognitive communication corresponding to a scheme where the relay receives information of the base station without the recognition of the base station. At this time, modes in which the DRX scheme is used, include an idle mode (RRC_idle mode) and a connected mode (RRC_connected mode).

A basic condition between the base station 20 and the relay 30 is that the base station 20 and the relay 30 exchange information with each other and set a self configuration, when the relay 30 first connects to the network and proceeds with the self configuration. In an example of the basic condition, the relay 30 follows a transmission algorithm of the base station 20 except for the case of hindering the processing of data of the highest priority such as urgent communication and the operational stability of the relay.

1. The relay 30 receives parameters for implementing a transmission algorithm of the relay 30, from the base station 20.

2. When there is no control information on a particular algorithm from the base station 20, the final result of the relevant algorithm is determined by the relay 30.

Information is exchanged between the base station 20 and the relay 30 by using the cooperative communication scheme or the cognitive communication scheme based on the conditions as described above. When the information is exchanged between the base station 20 and the relay 30, the base station 20 and the relay 30 may comply with the previously defined communication protocol. Otherwise, a new communication protocol is first defined only for the exchange of information between the base station 20 and the relay 30, and then the base station 20 and the relay 30 may comply with the new communication protocol.

FIG. 7 is a view illustrating a structure for data transmission considering a relay system using component carriers according to an embodiment of the present invention. FIG. 7 conceptually illustrates a method for operating a relay in an example of an environment which may be created in a wireless communication system (e.g. the LTE-Advanced system).

Referring to FIG. 7, the user equipment 10 may camp on a relevant cell in an RRC_idle mode. Then, in an RRC_connected mode, the user equipment 10 may send a request for resource allocation to the relevant cell, may receive resources allocated to component carrier 1, and may perform communication through link 1. However, it is assumed that there occurs a situation where the user equipment 10 makes an additional request for resource allocation and thus resources of a first component carrier CC1 become short and resources of a second component carrier CC2 must be allocated to the first component carrier. Otherwise, it is assumed that there occurs a situation where channel conditions of a currently used component carrier become poor and thus resources of the second component carrier CC2 must be allocated to the currently used component carrier.

At this time, as shown in FIG. 7, the cooperative communication of the base station 20 and the relay 30, or the cognitive communication determines that it is more efficient to transmit information from the base station 20 to the user equipment 10 through link 2 by using resources of the second component carrier CC2 than to transmit data from the base station 20 to the user equipment 10 through link 1 by using the resources of the second component carrier CC2. Accordingly, data is transmitted through link 2 by using the resources of the second component carrier CC2.

In this case, because component carriers have different system characteristics, DRX-related control information or system information of the second component carrier CC2, which is transmitted through the relay 30, is transmitted through a path between the base station 20 and the relay 30, which is link 2-1, in the cooperative communication scheme between the base station 20 and the relay 30 or the cognitive communication scheme. Herein, the DRX-related control information may be DRX-related control information of the second component carrier, or DRX-related control information of the first component carrier. Based on this DRX-related control information, the relay 30 additionally considers QoS of data served through the second component carrier, link performance between the relay 30 and the user equipment 10, etc., generates final DRX-related information between the relay 30 and the user equipment 10, and transmits the generated final DRX-related information through a path between the user equipment 10 and the relay 30, which is link 2-2, or through a path of broadcasting No. 3.

In other words, the relay 30 generates various pieces of DRX-related information including a wake-up cycle, the various pieces of DRX-related information may be allocated to the user equipment 10 when the user equipment 10 is initially registered on the network, and the DRX parameters allocated to the user equipment 10 may be changed while the user equipment 10 operates when necessary.

At this time, parameters which can be changed, for example, may be the On-duration Timer (onDurationTimer), the Inactivity Timer (drx-InactivityTimer), the SR-pending Timer, the UL retransmission Timer, the DL retransmission Timer, the Short cycle timer, etc.

FIG. 8 is a signal flow diagram illustrating the transmission of component carrier-related information considering a relay in a wireless communication system according to an embodiment of the present invention.

Referring to FIG. 8, the base station 20 transmits a packet to the user equipment 10 through the first component carrier CC1 (S10). The user equipment 10 may camp on a relevant cell in an RRC_idle mode. Then, in an RRC_connected mode, the user equipment 10 may send a request for resource allocation to the relevant cell, may receive resources allocated to the first component carrier CC1, and may communicate with the base station 20 through a link (link 1 shown in FIG. 7) between the base station 20 and the user equipment 10. In S10, the user equipment 10 receives a packet from the base station 20 through the first component carrier CC1.

Meanwhile, when there occurs a situation where resources of the first component carrier are short or channel conditions of a currently used component carrier are poor, the base station 20 determines whether resources are to be allocated to an additional component carrier (the second component carrier CC2 shown in FIG. 7) (S20).

In this case, because component carriers have different system characteristics, DRX-related control information or system information of the second component carrier CC2, which is transmitted through the relay 30, is transmitted from the base station 20 to the relay 30, through the path (link 2 shown in FIG. 7) between the base station 20 and the relay 30, in the cooperative communication scheme between the base station 20 and the relay 30 or the cognitive communication scheme (S30). Herein, the DRX-related control information may be, for example, DRX-related control information of the second component carrier CC2, or DRX-related control information of the first component carrier CC1.

Based on this DRX-related control information, the relay 30 additionally considers QoS of data served through the second component carrier CC2, link performance between the relay 30 and the user equipment 10, etc., and determines and generates final DRX-related information between the relay 30 and the user equipment 10 (S40). Namely, by performing steps S20, S30 and S40 between the base station 20 and the relay 30, the relay 30 may process the DRX-related information received from the base station 20 or may not apply any processing to it, and then may provide the processed or unprocessed DRX-related information to the user equipment 10.

More specifically, the relay 30 may adjust DRX cycles of two or more component carriers so as to cause a coincidence between them, in consideration of the received DRX-related information. Namely, the relay 30 may control the user equipment 10 so as to cause a coincidence between DRX cycles of the component carriers and so as to cause a coincidence between on-durations of the component carriers. In this case, steps S20, S30 and S40 between the base station 20 and the relay 30 do not need to be separately recognized (or notified) by the user equipment.

Hereinafter, the relay 30 transmits the determined and generated DRX-related information (e.g. a DRX cycle or an active time) of the second component carrier CC2 to the user equipment 10 through a path (path 2 shown in FIG. 7) between the user equipment 10 and the relay 30 or the path of broadcasting No. 3 (S50).

The user equipment 10 determines a DRX operation with reference to the DRX-related information of the second component carrier CC2 received from the relay 30 (S60). Namely, during a DRX cycle, the user equipment 10 may turn on a receiver or a reception modem thereof and may receive the DRX-related information of the second component carrier CC2 and data transmitted from the relay 30. For a period other than the DRX cycle, the user equipment 10 turns off the receiver and operates in a power saving mode.

Accordingly, it is possible to reduce power leakage which may occur in the wireless communication system using the relay 30, and seek the operational stability of the wireless communication system, and simultaneously, it is possible to efficiently satisfy a required service together with reducing power consumption of the user equipment 10 to a minimum.

FIG. 9 to FIG. 11 are views each illustrating a configuration in which a user equipment adjusts a DRX cycle and a DRX on-duration in an idle mode according to the present invention.

Referring to FIG. 9, the base station 20 transmits DRX-related information of the first component carrier CC1 directly to the user equipment 10 as shown at the upper end of FIG. 9 in an idle mode. Also, the base station 20 transmits DRX-related information of the first component carrier CC1 and control information of the second component carrier CC2 to the relay 30.

Thereafter, as shown at the lower end of FIG. 9, the relay 30 determines DRX-related information of the second component carrier CC2 based on the DRX-related information of the first component carrier CC1 and the control information of the second component carrier CC2, which have been received from the base station 20, and transmits the determined DRX-related information of the second component carrier CC2 to the user equipment 10.

At this time, the DRX-related information of the second component carrier CC2 includes a DRX cycle and a DRX on-duration of the second component carrier CC2, which coincide with a DRX cycle and a DRX on-duration of the first component carrier CC1, respectively.

Namely, the user equipment receives the adjusted DRX-related information of the second component carrier transmitted from the relay, and performs a DRX operation. As a result, in the idle mode, the base station 20 may transmit the DRX-related information to the relay 30, and accordingly, the relay 30 may cause a coincidence between DRX cycles of component carriers and may cause a coincidence between on-durations through the user equipment.

Accordingly, the user equipment 10 may bring about a coincidence of DRX cycles and a coincidence of on-durations between the first component carrier CC1 and the second component carrier CC2, and may perform a DRX operation. Therefore, the above operation supports the advantage of reducing power consumption of the user equipment.

Referring to FIG. 10, the base station 20 transmits DRX-related information of the first component carrier CC1 directly to the user equipment 10 as shown at the upper end of FIG. 10 in an idle mode. In the idle mode, the base station 20 transmits DRX-related information of the first component carrier CC1 and control information of the second component carrier CC2 to the relay 30.

Thereafter, as shown at the lower end of FIG. 10, the relay 30 determines DRX-related information of the second component carrier CC2 based on the DRX-related information of the first component carrier CC1 and the control information of the second component carrier CC2, which have been received from the base station 20, and transmits the determined DRX-related information of the second component carrier CC2 to the user equipment 10.

At this time, the DRX-related information of the second component carrier CC2 includes information required to cause a coincidence between DRX cycles (1) and increase a DRX on-duration in case link performance between the relay 30 and the mobile communication user equipment 10 is degraded and thus it is not easy to receive information through a PDCCH (2). Namely, the user equipment 10 may cause a coincidence between DRX cycles of the first component carrier CC1 and the second component carrier CC2, and may set a DRX on-duration of the second component carrier CC2 so as to be longer. Accordingly, a monitoring time period of the second component carrier CC2 becomes longer, so that it is possible to prevent the non-reception of information through the PDCCH caused by the degradation of the link performance.

Referring to FIG. 11, in an idle mode, the relay 30 first changes a DRX cycle of the second component carrier CC2 to a short DRX cycle (long short) in consideration of link performance, etc., and then the base station 20 transmits DRX-related information of the first component carrier CC1 and control information of the second component carrier CC2 to the relay 30.

The relay 30 receives the DRX-related information from the base station 20, and again changes the DRX cycle of the second component carrier to a long DRX cycle (short→long).

In the idle mode, as described above with reference to FIG. 9 to FIG. 11, the relay 30 refers to or uses the DRX-related information of the first component carrier CC1 and the control information of the second component carrier CC2, which have been received from the base station 20. At this time, the relay 30 generates DRX-related information of the second component carrier CC2 in consideration of the user equipment and link performance, a channel state, or the like.

Thereafter, the relay 30 transmits the generated DRX-related information of the second component carrier CC2 to the user equipment. Namely, the user equipment 10 may cause a DRX cycle of the second component carrier CC2 to coincide with a DRX cycle of a first component carrier CC1 in a state where the DRX cycle of the second component carrier CC2 is set so as to be shorter than the DRX cycle of the first component carrier CC1. A change of a DRX cycle (short→long or long→short) may be provided from the relay 30 to the user equipment 10 through a DRX command.

FIG. 12 and FIG. 13 are views each illustrating a configuration in which a user equipment adjusts a DRX cycle and a DRX on-duration in a connected mode according to the present invention.

First, referring to FIG. 12, in a connected mode (i.e. an RRC_connected mode), in a situation where there is no data transmitted to the user equipment 10 through the first component carrier CC1, when urgent data is delivered to the relay 30, the relay 30 receives a control signal for changing a DRX cycle from the base station 20 (1), and controls the second component carrier CC2 so as to have a DRX cycle different from a DRX cycle of the first component carrier CC1 (1).

When a large amount of data is delivered from the base station 20 to the relay 30 while the relay 30 processes the urgent data, the relay 30 independently determines a scheme for increasing a DRX on-duration and notifies the user equipment 10 of the determined scheme (2). Accordingly, the user equipment 10 identifies DRX-related information (i.e. information required to cause a DRX on-duration to become longer due to an increase in the amount of data) of the second component carrier from the relay 30, sets the second component carrier in order to have an identical DRX cycle but have a longer on-duration, and increases a monitoring time period for receiving data. Therefore, the user equipment 10 ensures a maximum reception rate so that there is no loss of data.

Referring to FIG. 13, in a connected mode, in a situation where there is no data transmitted to the user equipment 10 through the first component carrier CC1, when urgent data is delivered to the relay 30, the relay 30 receives a control signal for changing a DRX cycle from the base station 20 (1), controls the second component carrier CC2 so as to have a DRX cycle different from a DRX cycle of the first component carrier CC1, and increases a DRX on-duration based on its own decision (1). While the relay 30 processes the urgent data, there is no large amount of data which is delivered from the base station 20 to the relay 30.

When urgent data has arrived but can be immediately processed, the relay 30 independently determines that a DRX cycle and a DRX on-duration of the second component carrier CC2 is again changed to a DRX cycle and a DRX on-duration of the first component carrier CC1, respectively, and then notifies the user equipment 10 of the determination (2). Accordingly, the user equipment 10 performs a DRX operation on a long DRX cycle, for the first component carrier CC1.

Namely, in order to enable the processing of urgent data or the processing of a large amount of data, the user equipment 10 shown in FIG. 12 and FIG. 13 may set a DRX on-duration so as to be longer, or may set a DRX cycle so as to be shorter during a DRX mode of the second component carrier CC2. It goes without saying that after the processing of data is completed, the user equipment 10 may set a DRX on-duration or a DRX cycle of the second component carrier CC2 so as to coincide with a DRX on-duration or a DRX cycle of the first component carrier CC1. The relay 30 may also provide a change of a DRX on-duration of DRX to the user equipment 10 through a DRX command as described above.

FIG. 14 is a flowchart illustrating a process for controlling DRX by a user equipment 10 according to an embodiment of the present invention. Hereinafter, the operation of the user equipment 10, which has been described with reference to FIGS. 8 to 13, will be described in more detail.

Referring to FIG. 14, the user equipment receives DRX-related control information or system information of a first component carrier from the base station (S1410). In this case, the above reception may further include that the user equipment receives, as it is, the DRX-related control information and the system information of the first component carrier transmitted by the base station through the relay.

In S1410, the user equipment sets a DRX cycle and a DRX on-duration of the first component carrier by using the received information (S1420).

Accordingly, the user equipment may maintain a DRX mode for the first component carrier. Thereafter, the user equipment receives DRX-related control information or system information of a second component carrier from the relay (S1430).

The relay may use the information determined in steps S30 and S40 shown in FIG. 8, or the information received from the base station in FIGS. 9 to 13. The user equipment may adjust a DRX cycle, an active time and a DRX on-duration of the second component carrier received from the relay, by using the DRX cycle and the DRX on-duration of the first component carrier received from the base station and the information received in S1430 (S1440).

At this time, the user equipment may set each of a DRX cycle, an active time and a DRX on-duration, which are adjustable, in order to have various values. Herein, the active time signifies a time period for which information may be received through a PDCCH. The above setting may be performed by using the information which the relay first determines before S1430 and then transmits in S1430, as described above.

Accordingly, in steps S1450, S1460 and S1465, the user equipment may identify by using the information received from the relay whether a DRX cycle, an active time and a DRX on-duration of the second component carrier coincide with a DRX cycle, an active time and a DRX on-duration of the first component carrier, respectively.

A case where a DRX cycle and a DRX operation of the second component carrier coincide with a DRX cycle and a DRX operation of the first component carrier, respectively, corresponds to an embodiment shown in FIG. 9. Accordingly, the user equipment brings about a coincidence of DRX cycles and a coincidence of on-durations between the first component carrier and the second component carrier, and maintains an identical DRX mode for the first component carrier and the second component carrier (S1472).

Meanwhile, a case where there is a coincidence of DRX cycles between the first component carrier and the second component carrier but there is no coincidence of on-durations therebetween, is as shown in FIG. 10. Accordingly, with respect to the DRX-related information of the second component carrier CC2 received from the relay, the user equipment may cause a coincidence between DRX cycles of the first component carrier and the second component carrier, and may increase a DRX on-duration corresponding to an operation time period of the second component carrier, in case link performance between the relay 30 and the mobile communication user equipment 10 is degraded and thus it is not easy to receive information through a PDCCH. For example, as shown in FIG. 12 and/or FIG. 13, when there is a large amount of data to be processed among multiple pieces of urgent data, the relay may set a DRX on-duration of a relevant component carrier so as to be longer. Accordingly, in this condition, the user equipment may cause a coincidence between DRX cycles of the first component carrier and the second component carrier, and may maintain a DRX mode for each of the first component carrier and the second component carrier by changing on-durations of the first component carrier and the second component carrier (S1474).

Meanwhile, when a DRX cycle of the second component carrier does not coincide with a DRX cycle of the first component carrier, the user equipment proceeds to S1465.

For example, when the performance of the second component carrier is degraded or urgent data is delivered to the relay, the user equipment may set a DRX cycle of the second component carrier so as to be shorter. Even in this case, the user equipment may set a multiple of a DRX cycle of the second component carrier so as to coincide with a DRX cycle of the first component carrier. Accordingly, when a DRX cycle of the second component carrier does not coincide with a DRX cycle of the first component carrier, the user equipment, for example, may cause a coincidence between on-durations of the first component carrier and the second component carrier and may maintain a DRX mode for each of the first component carrier and the second component carrier, as shown in FIG. 13 (S1476).

Meanwhile, even when a DRX cycle and a DRX on-duration of the second component carrier do not coincide with a DRX cycle and a DRX on-duration of the first component carrier in such a manner that a DRX cycle and a DRX on-duration of the second component carrier become a predetermined multiple of a DRX cycle and a predetermined multiple of a DRX on-duration in the first component carrier, respectively, the user equipment identifies a DRX cycle and a DRX on-duration of each component carrier, and performs discontinuous reception (DRX) of each component carrier (S1478).

A DRX mode for the second component carrier control may be controlled before steps S1472, S1474, S1476 and S1478 as described above, and the user equipment may perform DRX by using newly defined DRX parameters in steps S1472, S1474, S1476 and S1478, according to the control of the relay.

As described above, the user equipment may control a DRX mode for each of the first component carrier and the second component carrier, as shown in FIG. 14. Otherwise, DRX of the second component carrier may be controlled so as to be performed according to a DRX cycle or a DRX on-duration of the first component carrier or a DRX cycle and a DRX on-duration thereof. In this case, setting, in a DRX mode, an active time of the second component carrier so as to coincide with an active time of the first component carrier may be further included.

To this end, the user equipment may include a separate element or elements for wireless communication capable of providing the setting of a DRX mode and control functions together. Herein, an element for providing the setting of DRX and an element for providing control functions are called a DRX setter and a DRX controller, respectively.

In this case, the DRX setter may receive DRX-related control information or system information of the first component carrier from the base station, may set a DRX cycle and a DRX on-duration of the first component carrier by using the information received from the base station, and may first receive DRX-related control information or system information of the second component carrier from the relay and then may adjust a DRX cycle and a DRX on-duration of the second component carrier by using the DRX cycle and the DRX on-duration of the first component carrier and by using the information received in S1430. The DRX controller may determine whether a DRX cycle and a DRX on-duration of the second component carrier coincide with a DRX cycle and a DRX on-duration of the first component carrier, respectively, and may control DRX for each of the first component carrier and the second component carrier.

As described above, the DRX setter and the DRX controller may be included in another element for wireless communication of the user equipment.

Hereinafter, although the exemplary embodiments have been described with reference to the accompanying drawings, the present invention is not limited to the exemplary embodiments. In the exemplary embodiments, two component carriers have been described for illustrative purposes, but the present invention is not limited to this configuration.

For example, the base station may transmit control information or system information of some of three or more component carriers to the user equipment, and then the relay may transmit control information or system information of the remaining component carriers of the three or more component carriers to the user equipment. When the base station can use five component carriers each having a bandwidth of 20 MHz, the base station may transmit control information or system information of three of the five component carriers directly to the user equipment, and the relay may generate control information/system information of two of the five component carriers and may transmit the generated control information/system information to the user equipment.

At this time, the number of component carriers used by the base station and the relay may be fixed or variable. In a case where the number of component carriers used by the base station and the relay is variable, the number of component carriers used by the base station and the relay may be changed in consideration of link performance, a channel state, the number of subscribers, QoS and the like of the base station and the user equipment or of the relay and the user equipment. Also, when all external environments are identical but there is a difference between internal environments such as a system operating scheme, and the characteristics and a version of the user equipment, generated control information and system information may depend on the difference between the internal environments.

The invention claimed is:

1. A method for transmitting data by a relay in a wireless communication system, the method comprising:
   generating a parameter for controlling discontinuous reception (DRX) of a second component carrier discriminated from a parameter for controlling discontinuous reception of a first component carrier used by a base station; and
   transmitting the generated parameter for controlling the discontinuous reception of the second component carrier to a user equipment;
   wherein generating of the parameter for controlling the discontinuous reception (DRX) of the second component carrier further comprises:
   setting the parameter for controlling the discontinuous reception of the second component carrier so as to be identical to the parameter for controlling the discontinuous reception of the first component carrier with reference to the parameter for controlling the discontinuous reception of the first component carrier used by the base station, and
   in consideration of at least one of a channel state and a link performance of the user equipment and with reference to a DRX cycle and an active time or a DRX on-duration of the first component carrier,
   setting a DRX cycle of the second component carrier so as to be identical to the DRX cycle of the first component carrier, or setting a DRX on-duration of the second component carrier so as to be identical to the DRX on-duration of the first component carrier, or setting the DRX cycle and the DRX on-duration of the second component carrier so as to be identical to the DRX cycle and the DRX on-duration of the first component carrier, respectively.

2. The method as claimed in claim 1, further comprising:
   receiving at least one of the parameter for controlling the discontinuous reception of the first component carrier and DRX-related information of the parameter for controlling the discontinuous reception of the second component carrier from the base station; and
   transmitting at least one of the received parameter and the generated parameter to the user equipment.

3. The method as claimed in claim 1, wherein the parameter for controlling the discontinuous reception includes information on a DRX cycle and an active time or a DRX on-duration.

4. The method as claimed in claim 1, wherein generating of the parameter for controlling the discontinuous reception (DRX) of the second component carrier further comprises: in consideration of at least one of the channel state and the link performance of the user equipment and with reference to the DRX cycle and the active time or the DRX on-duration of the first component carrier, setting the DRX cycle and the DRX on-duration of the second component carrier so as to be different from the DRX cycle and the DRX on-duration of the first component carrier, respectively.

5. A method for transmitting data in a wireless communication system, the method comprising:
   generating at least one of control information and system information for controlling discontinuous reception (DRX) of a first component carrier by a base station;
   transmitting the generated at least one of the control information and the system information for controlling the discontinuous reception of the first component carrier from the base station to at least one of a relay and a user equipment;
   receiving, by the relay from the base station, at least one of information of the control information for controlling the DRX of the first component carrier, the system information for controlling the DRX of the first component carrier, DRX-related information of control information for controlling DRX of a second component carrier, and DRX-related information of system information for controlling the DRX of the second component carrier;
   generating, by the relay, at least one of the control information and the system information for controlling the DRX of the second component carrier discriminated from the at least one of the control information and the system information for controlling the DRX of the first component carrier in consideration of at least one of a channel state and a link performance of the user equipment; and
   transmitting the generated at least one of the control information and the system information for controlling the DRX of the second component carrier from the relay to the user equipment,
   wherein generating of at least one of the control information and the system information for controlling the DRX of the second component carrier comprises generating, by the relay, the at least one of the control information and the system information for controlling the DRX of the second component carrier by using the at least one information received from the base station.

6. The method as claimed in claim 5, wherein the at least one of the control information and the system information for controlling the DRX of the second component carrier is generated to be identical to the at least one of the control information and the system information for controlling the DRX of the first component carrier in consideration of the at least one of the channel state and the link performance of the user equipment.

7. The method as claimed in claim 5, wherein the control information and the system information for controlling the DRX comprises information related to a DRX cycle and an active time or a DRX on-duration.

8. A method for receiving data by a user equipment in a wireless communication system, the method comprising:
   receiving at least one information of DRX-related control information and system information of a first component carrier from a base station;
   performing a discontinuous reception (DRX) operation for the first component carrier according to the at least one received information;
   receiving, from a relay, at least one of DRX-related control information and system information of a second component carrier discriminated from the first component carrier; and
   performing a discontinuous reception operation for the second component carrier so as to be discriminated from the discontinuous reception operation for the first component carrier according to the at least one information received from the relay,
   wherein performing the discontinuous reception operation for the second component carrier comprises: performing, by the user equipment, a DRX operation according to the at least one information received from the relay so that a DRX cycle of the second component carrier is identical to a DRX cycle of the first component carrier, or performing, by the user equipment, a DRX operation according to the at least one information received from the relay so that a DRX on-duration of the second component carrier is identical to a DRX on-duration of the first component carrier, or performing, by the user equipment, a DRX operation according to the at least one information received from the relay so that the DRX cycle and the DRX on-duration of the second component carrier are identical to the DRX cycle and the DRX on-duration of the first component carrier, respectively.

9. The method as claimed in claim 8, wherein the DRX-related control information and the system information comprises information related to a DRX cycle and an active time or a DRX on-duration.

10. The method as claimed in claim 8, wherein the discontinuous reception operation for the second component carrier is performed so as to be identical to the discontinuous reception operation for the first component carrier according to the at least one information received from the relay.

11. The method as claimed in claim 8, further comprising: performing a DRX operation, by the user equipment according to the at least one information received from the relay so that a DRX cycle of the second component carrier becomes a multiple of a DRX cycle of the first component carrier, or performing a DRX operation, by the user equipment according to the at least one information received from the relay so that a DRX on-duration of the second component carrier becomes a multiple of a DRX on-duration of the first component carrier, or performing a DRX operation, by the user equipment according to the at least one information received from the relay so that the DRX cycle and the DRX on-duration of the second component carrier become a multiple of the DRX cycle and a multiple of the DRX on-duration of the first component carrier, respectively.

12. The method as claimed in claim 11, further comprising performing a DRX operation, by the user equipment according to the at least one information received from the relay so that the DRX cycle and the DRX on-duration of the second component carrier are independent of the DRX cycle and the DRX on-duration of the first component carrier.

13. A method for receiving data by a user equipment, the method comprising:
   receiving discontinuous reception (DRX)-related control information or system information of a first component carrier from a base station;
   setting a DRX cycle and a DRX on-duration of the first component carrier by using the information received from the base station;
   receiving DRX-related control information or system information of a second component carrier from a relay;
   adjusting a DRX cycle and a DRX on-duration of the second component carrier by using the DRX cycle and the DRX on-duration of the first component carrier and the received information from the relay;
   determining whether the DRX cycle and the DRX on-duration of the second component carrier coincide with the DRX cycle and the DRX on-duration of the first component carrier; and
   controlling DRX of the first component carrier and DRX of the second component carrier,
   wherein adjusting the DRX cycle and the DRX on-duration of the second component carrier comprises: adjusting the DRX cycle of the second component carrier so as to be identical to the DRX cycle of the first component carrier, or adjusting the DRX on-duration of the second component carrier so as to be identical to the DRX on-duration of the first component carrier, or adjusting the DRX cycle and the DRX on-duration of the second component carrier so as to be identical to the DRX cycle and the DRX on-duration of the first component carrier, respectively.

14. The method as claimed in claim 13, wherein the DRX cycle and the DRX on-duration of the second component carrier coincide with the DRX cycle and the DRX on-duration of the first component carrier, respectively.

15. The method as claimed in claim 13, wherein the DRX on-duration of the second component carrier is longer than the DRX on-duration of the first component carrier when a performance of the second component carrier is more degraded than a performance of the first component carrier or when there exists data to be transmitted/received through the second component carrier.

16. The method as claimed in claim 13, wherein the DRX cycle of the second component carrier is shorter than the DRX cycle of the first component carrier when data requiring transmission/reception is generated in the second component carrier or when a performance of the second component carrier is degraded.

17. The method as claimed in claim 13, wherein the DRX-related control information or the system information of the second component carrier, which is received from the relay, is generated by the relay by using the DRX-related control information or the system information of the first component carrier received from the base station.

18. The method as claimed in claim 13, wherein the DRX-related control information or the system information of the second component carrier, which is received from the relay, is generated by the relay by using at least one of a link performance and a channel state of the relay and the user equipment.

19. A user equipment to control a discontinuous reception (DRX) mode, the user equipment comprising:
   a DRX setter to receive DRX-related control information or system information of a first component carrier from a base station, setting a DRX cycle and a DRX on-duration of a first component carrier by using the information received from the base station, to receive DRX-related control information or system information of a second component carrier from a relay, and to adjust a DRX cycle and a DRX on-duration of the second component carrier by using the DRX cycle and the DRX on-duration of the first component carrier and the information received from the relay; and a DRX controller to determine whether the DRX cycle and the DRX on-duration of the second component carrier coincide with the DRX cycle and the DRX on-duration of the first component carrier, respectively, and to control DRX of the first component carrier and DRX of the second component carrier, wherein the DRX cycle of the second component carrier is adjusted so as to be identical to the DRX cycle of the first component carrier, or the DRX on-duration of the second component carrier is adjusted so as to be identical to the DRX on-duration of the first component carrier, or the DRX cycle and the DRX on-duration of the second component carrier are adjusted so as to be identical to the DRX cycle and the DRX on-duration of the first component carrier, respectively.

20. The user equipment as claimed in claim 19, wherein the DRX setter adjusts the DRX cycle of the second component carrier so as to become a multiple of the DRX cycle of the first component carrier, according to at least one information received from the relay, or adjusts the DRX on-duration of the second component carrier so as to become a multiple of the DRX on-duration of the first component carrier, according to at least one information received from the relay, or adjusts the DRX cycle and the DRX on-duration of the second component carrier so as to become a multiple of the DRX cycle and a multiple of the DRX on-duration of the first component carrier, respectively, according to at least one information received from the relay.

21. The user equipment as claimed in claim 19, wherein the DRX setter adjusts the DRX cycle and the DRX on-duration of the second component carrier so as to be independent of the DRX cycle and the DRX on-duration of the first component carrier, according to at least one information received from the relay.

* * * * *